(12) United States Patent
Heng et al.

(10) Patent No.: US 12,036,610 B2
(45) Date of Patent: Jul. 16, 2024

(54) MOLD FOR DOWNHOLE TOOL OR COMPONENT THEREOF

(71) Applicant: Halliburton Energy Services, Inc., Houston, TX (US)

(72) Inventors: Sotha Heng, Spring, TX (US); Dmitri Predtetchenski, Houston, TX (US); John William Varner, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 446 days.

(21) Appl. No.: 17/293,261

(22) PCT Filed: Dec. 27, 2018

(86) PCT No.: PCT/US2018/067698
§ 371 (c)(1),
(2) Date: May 12, 2021

(87) PCT Pub. No.: WO2020/139349
PCT Pub. Date: Jul. 2, 2020

(65) Prior Publication Data
US 2022/0001444 A1 Jan. 6, 2022

(51) Int. Cl.
*B22F 3/03* (2006.01)
*B22F 5/00* (2006.01)
(Continued)

(52) U.S. Cl.
CPC .................. *B22F 3/03* (2013.01); *B22F 5/00* (2013.01); *B23P 15/28* (2013.01); *E21B 10/42* (2013.01); *B22F 2005/001* (2013.01)

(58) Field of Classification Search
CPC ........ B22F 3/03; B22F 5/00; B22F 2005/001; B23P 15/28; E21B 10/42; B33Y 10/00; C22C 1/1036
See application file for complete search history.

(56) References Cited

U.S. PATENT DOCUMENTS

| | | | |
|---|---|---|---|
| 3,802,902 A | | 4/1974 | Turner, Jr. et al. |
| 4,226,277 A | * | 10/1980 | Matalon .................. B22C 1/186 |
| | | | 164/7.1 |

(Continued)

FOREIGN PATENT DOCUMENTS

JP  11-342460  12/1999

OTHER PUBLICATIONS

International Search Report and Written Opinion for PCT Patent Application No. PCT/US2018/067698, mailed Sep. 24, 2019; 13 pages.

*Primary Examiner* — Nahida Sultana
(74) *Attorney, Agent, or Firm* — Michael Jenney; C. Tumey Law Group PLLC

(57) ABSTRACT

The disclosure provides a mold for a downhole tool or component thereof. The mold includes a grain material, a sodium silicate and carbon dioxide reaction product, and between 0.1% and 10% graphite by weight, inclusive, graphite. The disclosure further provides a method of forming a mold for a downhole tool or component thereof by filling a mold housing with graphite/sodium silicate/grain material mixture including between 0.1% and 10% graphite by weight, inclusive and shaping the mixture into a pre-mold having the same shape as the mold to be formed, and subjecting the pre-mold to an atmosphere having elevated amounts of carbon dioxide as compared to ambient air for a time sufficient to allow the sodium silicate to react with the carbon dioxide to form sufficient reaction products to bind the other pre-mold components and solidify a mold.

20 Claims, 4 Drawing Sheets

(51) Int. Cl.
 *B23P 15/28* (2006.01)
 *E21B 10/42* (2006.01)

(56) References Cited

U.S. PATENT DOCUMENTS 7,624,787 B2 12/2009 Lee et al.
7,832,457 B2 11/2010 Calnan et al.

* cited by examiner

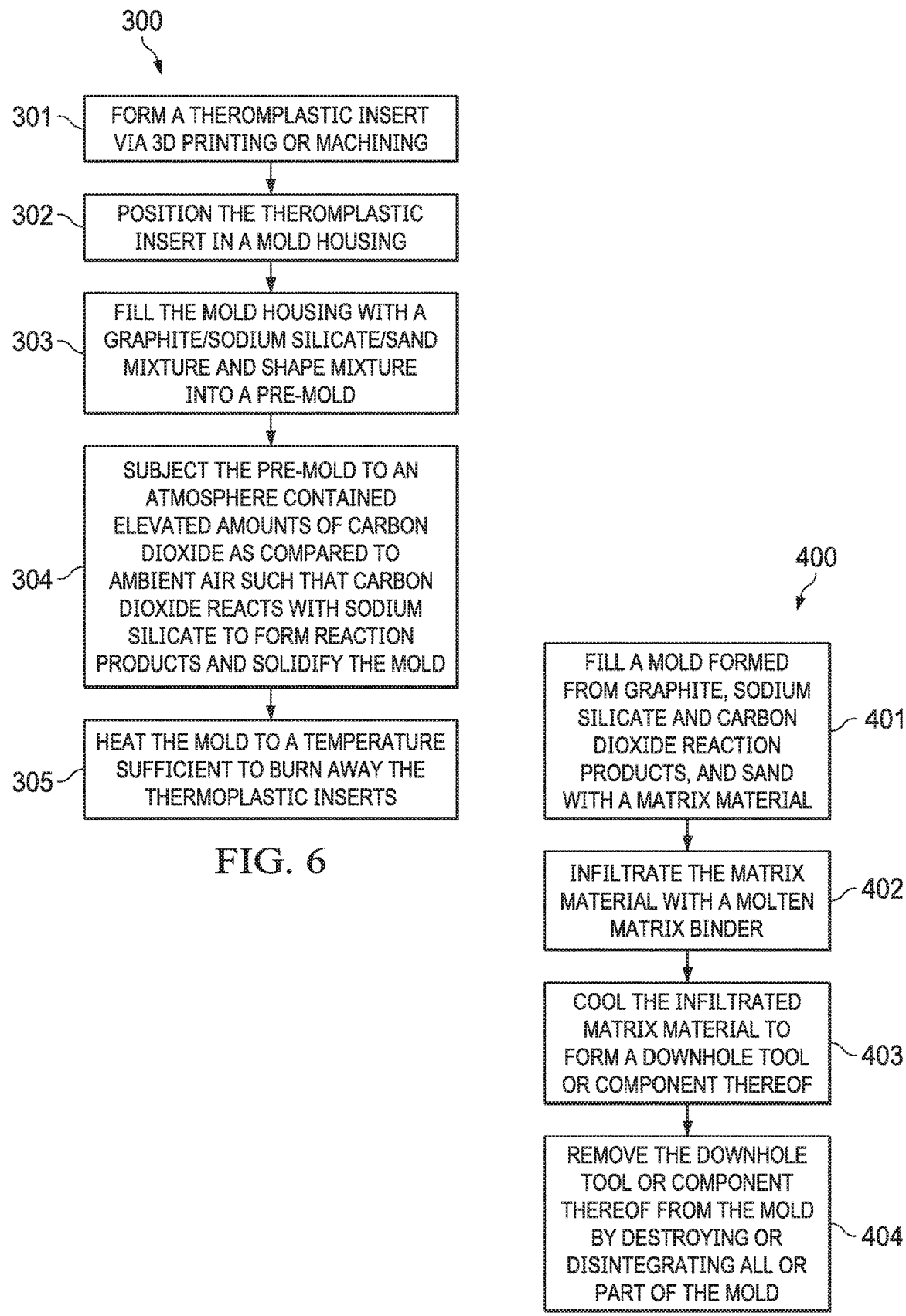

MOLD FOR DOWNHOLE TOOL OR COMPONENT THEREOF

RELATED APPLICATIONS

This application is a U.S. National Stage Application of International Application No. PCT/US2018/067698 filed Dec. 27, 2018, which designates the United States.

TECHNICAL FIELD

The present disclosure relates to a mold for use in forming a downhole tool, such as a rotary drill bit, or a component thereof.

BACKGROUND

Rotary drill bits and other downhole tools are frequently formed using a mold. These downhole tools often benefit from complex geometries, which are sometimes accommodated by inserting displacements in the mold. After the downhole tool is formed, the displacements are removed.

BRIEF DESCRIPTION OF THE DRAWINGS

The present disclosure may be better understood through reference to the following figures, which are not to scale, and in which like numbers represent like features:

FIG. 6 is a flow chart of a method of forming a mold;

FIG. 7 is a flow chart of a method of using a mold.

DETAILED DESCRIPTION

The present disclosure relates to a mold for forming a downhole tool or a component thereof. Suitable downhole tools include rotary drill bits, such as fixed-cutter drill bits and roller-cone drill bits, corers, and reamers. Although a fixed-cutter drill bit is used herein to illustrate the principles of the disclosure, the molds and methods of the disclosure are suitable for use in connection with any molded downhole tool or component thereof.

Molds of the present disclosure include graphite, reaction products of a mold binder precursor, such as sodium silicate and carbon dioxide, and a grain material, typically sand. Although sodium silicate is used as an example to illustrate the principles of the disclosure, other mold binder precursors that react with carbon dioxide to form reaction products that bind the mold may also be used. Although sand is used as an example to illustrate the principles of the disclosure, the molds and methods of the disclosure are suitable for use in connection with other materials of similar size, chemical reactivity, and resistivity.

A pre-mold is formed by pressing a graphite/sodium silicate/sand mixture into the shape of the mold. The pre-mold is then exposed to carbon dioxide ($CO_2$) to form a mold.

Certain molds of the present disclosure may also include a thermoplastic insert, typically a 3D printed thermoplastic insert. The mold may be formed by creating the thermoplastic insert, typically using 3D printing to allow the insert to have a complex geometry, then packing the remainder of the mold shape with a graphite/sodium silicate/sand mixture to form a pre-mold. Finally, the pre-mold is exposed to carbon dioxide, which solidifies the graphite/sodium silicate/sand mixture, then heated to burn out the thermoplastic insert, leaving only the mold. Thermoplastic inserts are particularly useful in molds for downhole tools with complex geometries.

A mold of the present disclosure may then be packed with matrix material, which is infiltrated with a matrix binder to form a downhole tool or component thereof having the shape of the mold. All or part of the mold may be disintegrated to release the downhole tool or component thereof.

Figure 1:
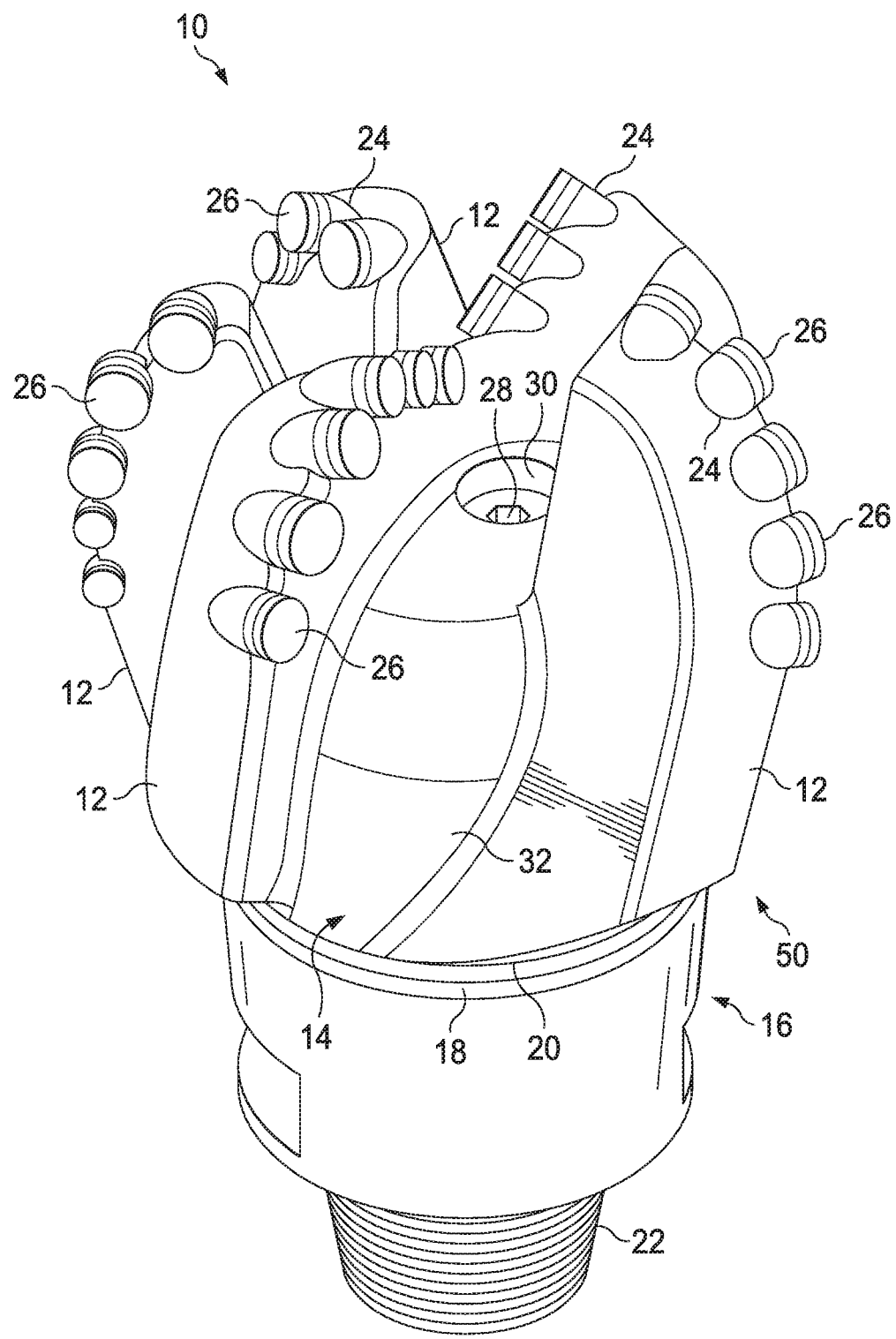
FIG. 1 is a schematic drawing showing a perspective view of a fixed-cutter drill bit, such as may be formed using a mold of the present disclosure.
Figure 2:
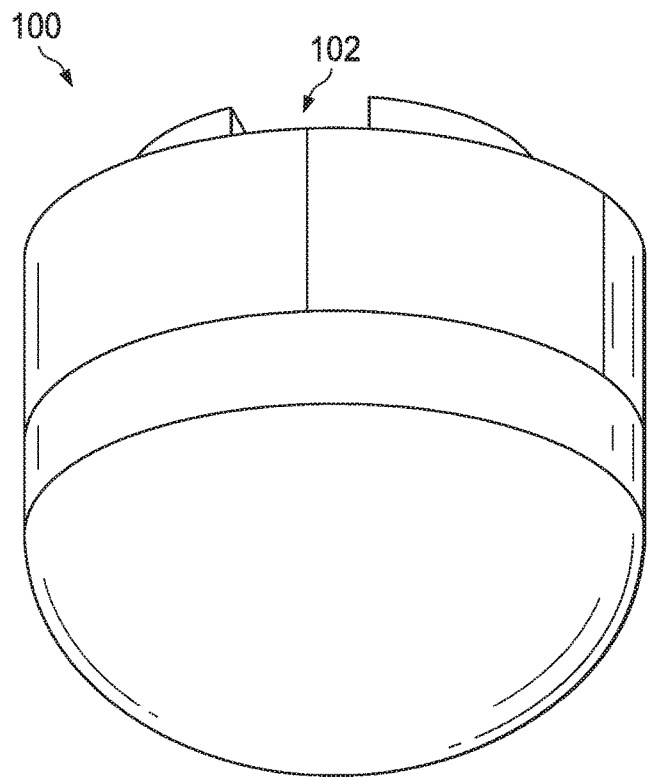
FIG. 2 is a schematic drawing showing a perspective view of a mold that may be used to form a bit head for a fixed-cutter drill bit.
Figure 3:
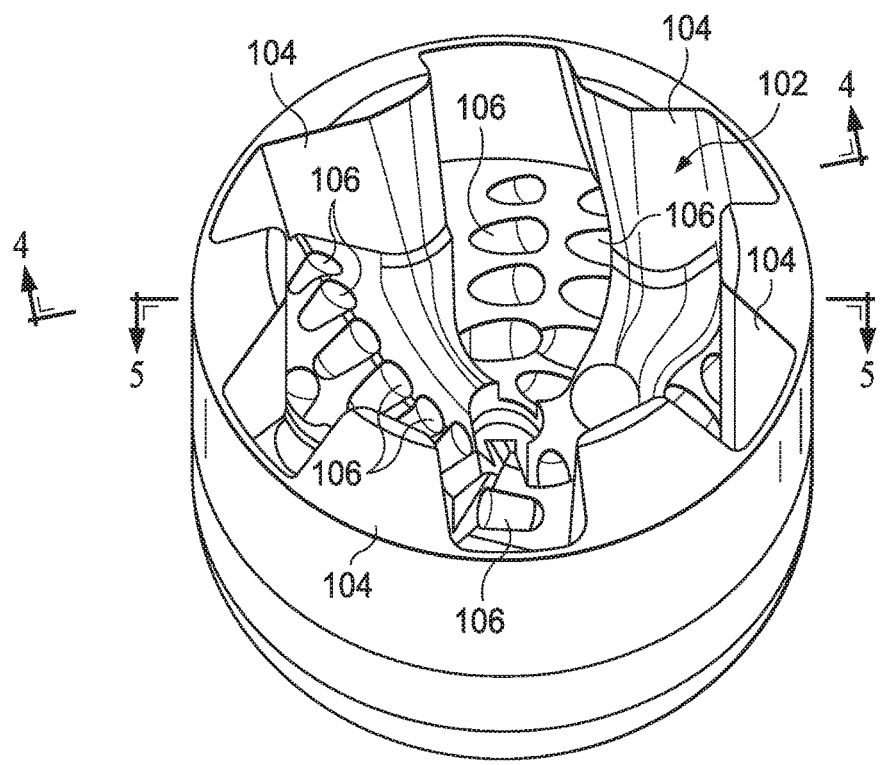
FIG. 3 is a schematic drawing showing a different perspective of the mold of FIG. 2.
Figure 4:
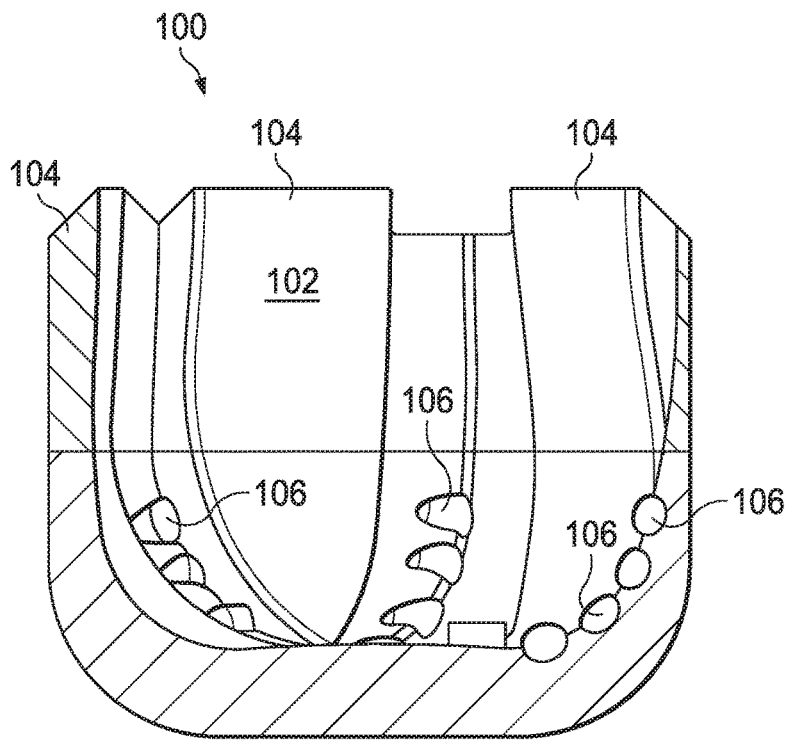
FIG. 4 is a schematic drawing showing a different perspective of the mold of FIG. 2.
Figure 5:
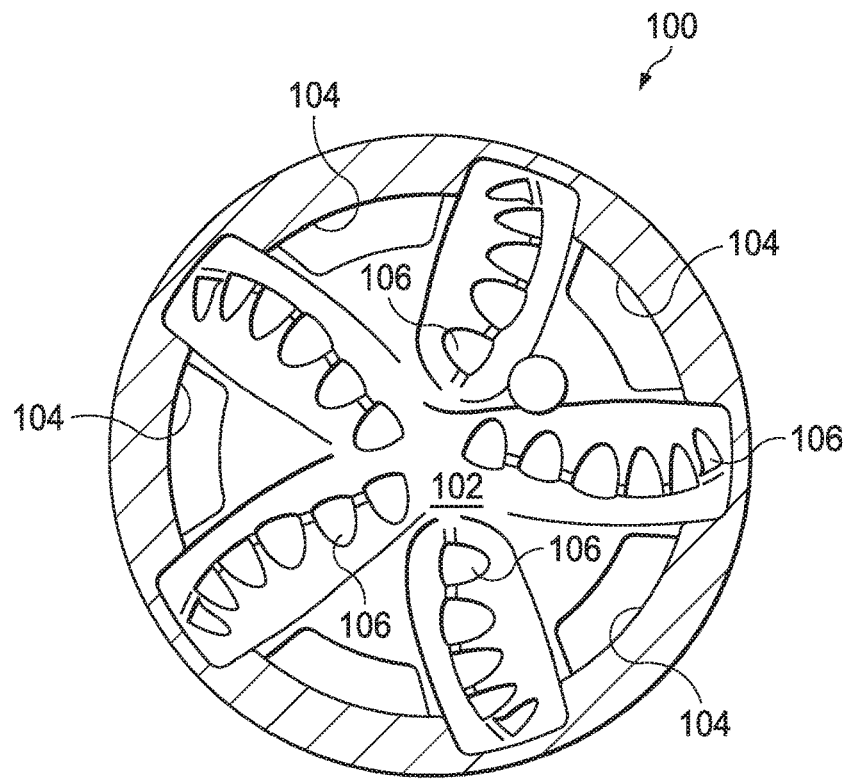
FIG. 5 is a schematic drawing showing a different perspective of the mold of FIG. 2.

Referring now to FIG. 1, a downhole tool formed using a mold of the present disclosure may include a fixed-cutter drill bit 10. The fixed cutter drill bit 10 has a plurality of cutter blades 12 arranged around the circumference of a bit head 14. The bit head 14 is connected to a shank 16 to form a bit body 50. Shank 16 may be connected to the bit head 14 by welding, for example by using laser arc welding to form a weld 18 around a weld groove 20, as shown. Shank 16 includes or is in turn connected to a threaded pin 22, such as an American Petroleum Institute (API) drill pipe thread. In this example, there are five cutter blades 12, in which pockets 24 are formed. Cutting elements 26, which may include various polycrystalline diamond cutting elements, are fixed in each pocket 24, for example by brazing. As the drill bit 10 is rotated in use, the cutting elements 26 come into contact with the formation, in order to remove material of the formation being drilled. During drilling, drilling mud is pumped downhole, through a drill string (not shown) on which the drill bit 10 would be supported, and out of nozzles 28 disposed in nozzle openings 30 in the bit head 14. Formed between each adjacent pair of cutter blades 12 are junk slots 32, along which cuttings, downhole debris, formation fluids and drilling fluid, etc., may pass, to be returned to the well surface along an annulus formed between exterior portions of the drill string and the interior of the wellbore being drilled.

A fixed-cutter drill bit, such as fixed-cutter drill bit 10 of FIG. 1, may be formed using a mold, such as mold 100 of FIGS. 2-5. As shown in FIGS. 2-5, the mold 100 may be bowl-shaped, having an inner mold cavity 102 that is substantially a negative image of the item or component thereof to be molded, in this case a fixed-cutter drill bit. For example, the projections 104 into the inner mold cavity 102 define the junk slots 32 between the cutter blades 12. The projections 106 define pockets that will eventually hold the cutting elements 26. The projections 104, the projections 106, or both may have complex geometries not readily achievable with conventional displacements. In such instances, the projections 104 or the projections 106 may be formed using thermoplastic inserts to confer their outer shapes, as discussed below.

Other downhole tool features, such as flow channels, may be formed in a similar manner using a mold of the present disclosure, with or without thermoplastic inserts. Such features may not be readily formable using conventional mold features and techniques because it is impossible to remove the downhole tool from the mold without destroying or damaging the feature.

In other examples, the mold may be for a component thereof of a downhole tool, such as housing for a sensitive component thereof, for example electronics, or a valve for use in a downhole tool. Such component thereof may otherwise not be readily formable from a matrix material. For example, even if a mold for such a component thereof that is able to withstand matrix formation conditions is created using conventional mold materials and techniques, the mold is often impossible to remove from the component thereof from the mold without destroying or damaging the component thereof.

A mold according to the present disclosure, such as mold 100, includes a solidified mixture of graphite, sodium silicate and carbon dioxide reaction products, and sand. In particular, the mold may include up to and including 10% graphite by weight. For example, the mold may include between 0.1% and 10% graphite by weight, inclusive. Alternatively, the mold may include sufficient graphite to have a resistivity of between 50 Ohms and 100,000 Ohms. Although resistivity is not directly used in molds and processes of this disclosure, it is a readily-measured surrogate for thermal conductivity of the mold conferred by graphite.

As used herein, sodium silicate designates one or a mixture of compounds having the general formula $Na_{2x}SiO_{2+x}$ or $(Na_2O)_x \cdot SiO_2$, such as sodium metasilicate, $Na_2SiO_3$, sodium orthosilicate, $Na_4SiO_4$, and sodium pyrosilicate $Na_6Si_2O_7$.

The mold may also include between 1% and 10% sodium silicate and carbon dioxide reaction products by weight, inclusive. Sodium silicate and carbon dioxide reaction products may include silica gel, which is an amorphous silicon dioxide.

The mold may include at least 75% grain material by weight, inclusive, to provide mechanical strength and physical integrity.

A mold according to the present disclosure, such as mold 100 may further include additional materials, such as at least one of Kaolin clay, carbon fiber, glass fiber, and any combinations thereof. Each of these additional materials may be present in an amount of between 0.1% to 5% by weight, inclusive.

A mold, such as the mold 100, may be formed using a method 300, as illustrated in FIG. 6. In step 301, a thermoplastic insert is formed via either 3D printing, machining a machinable polymer, or through combining multiple sections of a machinable polymer that have been machined or are machined after combination. The thermoplastic may be any thermoplastic suitable for use in 3D printing or machining with an ignition temperature or burning point of less than 1200° F. Suitable thermoplastics include polylactic acid (PLA), acrlyonitrile butadiene styrene (ABS), polyamide (PA), high impact polystyrene (HIPS), thermoplastic elastomer (TPE), polyoxymethylene (POM), and machinable or printable waxes. The thermoplastic insert may be designed using a 3D computer aided design (CAD) program and printed using any 3D printing equipment able to reproduce the design using a thermoplastic or machined through conventional shaping or forming methods suitable for use on a thermoplastic.

In step 302, the thermoplastic insert is positioned in a mold housing according to its final position within the mold. The mold housing may have a shape corresponding to at least a part of the shape of the mold.

In step 303, the mold housing is filled with a graphite/sodium silicate/sand mixture. The mixture may include up to and including 10% graphite by weight. For example, the mixture may include between 0.1% and 10% graphite by weight, inclusive. Alternatively, the mixture may include sufficient graphite to have a resistivity of at least 50 Ohms and less than 100,000 Ohms. Although not resistivity is not directly used in mixture, molds and processes of this disclosure, it is a readily-measured surrogate for thermal conductivity of the mixture conferred by graphite.

The mixture may also include between 0.5% and 10% sodium silicate by weight, inclusive. The mixture may include at least 75% grain material by weight, inclusive, to provide mechanical strength and physical integrity.

The mixture may further include additional materials, such as at least one of Kaolin clay, carbon fiber, glass fiber, and any combinations thereof. Each of these additional materials may be present in an amount of between 0.1% to 5% by weight, inclusive.

Also in step 303, the mixture is shaped into a pre-mold having the same shape as the mold to be formed.

Steps 302 and 303 need not be performed as entirely separate steps. For example, depending on the mold to be formed, it may be useful to first place some graphite/sodium silicate/sand mixture into the mold housing, then place a thermoplastic insert, which may be more readily held in place by the already-present mixture, then finish filling the mold housing with the mixture and any further inserts.

After a pre-mold has been formed, in step 304 it is subjected to an atmosphere containing elevated amounts of carbon dioxide as compared to ambient air. For example, the pre-mold may be subjected to an atmosphere containing at least 75% or at least 90% carbon dioxide. The atmosphere may be passively supplied, for example by simply placing the pre-mold in a chamber containing the carbon dioxide, or actively supplied, for example by blowing into the pre-mold.

The carbon dioxide reacts with the sodium silicate to form reaction products that bind the other pre-mold component thereof to one another and solidify the mold. The presence of sand provides passages that allow carbon dioxide to infiltrate the pre-mold. Accordingly, the speed at which the solidification occurs may depend on the relative amount of sand and the size of its particles, among other factors. After a period of time, typically between 10 seconds and 1 day, depending on curing method employed, the pre-mold has solidified to form a mold with thermoplastic inserts.

Next, in step 305, the mold with thermoplastic inserts is heated to a temperature sufficient to cause the thermoplastic inserts to burn away. Typically the temperature is above the burning point or ignition point of the thermoplastic material from which the inserts are formed, but below a temperature that might damage the mold. This step is often carried out in the presence of oxygen, such as in a normal atmosphere, to facilitate burning of the thermoplastic inserts. This step is carried out until the thermoplastic inserts are completely burned, leaving at most a carbon residue, and a completed mold. Typically the duration of step 305 is for a time between 1 hour and 1 day.

The presence of graphite in the mold helps prevent cracking or breaking of the mold during step 305 by distributing heat more quickly and evenly throughout the mold and facilitating an even heat distribution along the thermoplastic inserts.

The disclosure also provides, as illustrated in FIG. 7, a method 400 of using a mold according to the present disclosure to form a downhole tool or component thereof from a matrix material. In step 401, a mold formed from graphite, sodium silicate and carbon dioxide reaction products, and sand according to the present disclosure is filled with a matrix material, such as monotungsten carbide (WC), ditungsten carbide ($W_2C$), macrocrystalline tungsten carbide, other metal carbides, metal borides, metal oxides, metal nitrides, natural and synthetic diamond, polycrystalline diamond (PCD), and combinations thereof. The mold may also be partially filled with other materials, such as a metal blank.

Next, in step 402, the matrix material is infiltrated with a molten matrix binder, such as metallic alloys of copper (Cu), nickel (Ni), magnesium (Mn), lead (Pb), tin (Sn), cobalt (Co), silver (Ag), and combinations thereof. Phosphorous (P) may sometimes be added to the matrix binder to reduce the melting point.

The graphite in the mold also helps prevent cracking and breaking during this step 402 by distributing heat more quickly and evenly throughout the mold.

Finally, in step 403, the infiltrated matrix material is cooled to form the downhole tool or component thereof.

Finally, in step 404, the downhole tool or component thereof is removed from the mold. All or part of the mold is destroyed or disintegrated in this step. The presence of graphite also assists with removal from the mold by providing planes within the mold along which it tends to break. Such planes are not present or are reduced in number when sand and sodium silicate and carbon dioxide reaction products alone are present.

The present disclosure further includes variations of the molds and methods disclosed herein. For example, a mold may be formed from different materials, having different relative amounts of graphite. Such a mold will have different regions with different properties as a result. For instance, a region with more graphite will have higher thermal conductivity than a region with less graphite and will also have more planes along which the mold may break to allow removal of the downhole tool or component thereof. A region with more graphite may be provided in a mold to cause directional solidification of the mold. A region with more graphite may also be included in a mold to facilitate removal of the downhole tool or component thereof.

According to one example embodiment, the disclosure includes a mold for a downhole tool or component thereof. The mold includes a grain material, a sodium silicate and carbon dioxide reaction product, and between 0.1% and 10% graphite by weight, inclusive, graphite.

According to further embodiments, which may be combined with the above and with one another and with any of the other disclosure in this specification, unless clearly mutually exclusive: i) the grain material may include sand; ii) the mold may have a resistivity of between 50 Ohms and 100,000 Ohms, inclusive; iii) the mold may include between 1% and 10% sodium silicate and carbon dioxide reaction products by weight, inclusive; iv) the mold may include at least 75% grain material by weight; v) the mold may include at least one of Kaolin clay, carbon fiber, glass fiber, and any combinations thereof each in an amount of between 0.1% to 5% by weight, inclusive; and vi) the mold may include at least two regions having different amounts of graphite.

According to another example embodiment, the disclosure includes a method of forming a mold for a downhole tool or component thereof. The method includes filling a mold housing with graphite/sodium silicate/grain material mixture including between 0.1% and 10% graphite by weight, inclusive and shaping the mixture into a pre-mold having the same shape as the mold to be formed, and subjecting the pre-mold to an atmosphere having elevated amounts of carbon dioxide as compared to ambient air for a time sufficient to allow the sodium silicate to react with the carbon dioxide to form sufficient reaction products to bind the other pre-mold components and solidify a mold.

According to further embodiments, which may be combined with the above and with one another and with any of the other disclosure in this specification, unless clearly mutually exclusive: i) the method may further include forming a thermoplastic insert, positioning the thermoplastic insert in the mold, and after solidifying the mold, heating the mold to a temperature of at least the burn point or ignition point of the thermoplastic insert for a time sufficient to burn away the thermoplastic insert; ii) the method may further include 3D printing or machining the thermoplastic insert; iii) the grain material may include sand; iv) the mixture may have a resistivity of between 50 Ohms and 100,000 Ohms, inclusive; v) the mixture may include between 0.5% and 10% sodium silicate and carbon dioxide reaction products by weight, inclusive and at least 75% grain material by weight; vi) the mixture may include at least one of Kaolin clay, carbon fiber, glass fiber, and any combinations thereof each in an amount of between 0.1% to 5% by weight, inclusive; vii) the method may further include placing a mixture having one amount of graphite in a first region of the pre-mold and a mixture having a different amount of graphite in a second region of the pre-mold to form a first region of the mold having a different amount of graphite than a second region of the mold.

Although the present disclosure and its advantages have been described in detail, it should be understood that various changes, substitutions and alternations can be made herein without departing from the spirit and scope of the disclosure as defined by the following claims.

What is claimed is:

1. A method of forming a mold for a downhole tool or component thereof, the method comprising:
   filling a mold housing with graphite/sodium silicate/grain material mixture including between 0.1% and 10% graphite by weight, inclusive and shaping the mixture into a pre-mold having the same shape as the mold to be formed;
   subjecting the pre-mold to an atmosphere having elevated amounts of carbon dioxide as compared to ambient air for a time sufficient to allow the sodium silicate to react with the carbon dioxide to form sufficient reaction products to bind at least the graphite and solidify the mold;
   forming a thermoplastic insert;
   positioning the thermoplastic insert in the mold; and
   after solidifying the mold, heating the mold to a temperature of at least the burn point or the ignition point of the thermoplastic insert for a time sufficient to burn away the thermoplastic insert.

2. The method of claim 1, further comprising 3D printing or machining the thermoplastic insert.

3. The method of claim 1, wherein the grain material comprises sand, wherein the reaction products also bind the sand.

4. The method of claim 1, wherein the mixture has a resistivity of between 50 Ohms and 100,000 Ohms, inclusive.

5. The method of claim 1, wherein the mixture comprises between 0.5% and 10% sodium silicate and carbon dioxide reaction products by weight, inclusive and at least 75% grain material by weight.

6. The method of claim 1, wherein the mixture comprises at least one of Kaolin clay, carbon fiber, glass fiber, and any combinations thereof each in an amount of between 0.1% to 5% by weight, inclusive.

7. The method of claim 1, further comprising placing a mixture having one amount of graphite in a first region of the pre-mold and a mixture having a different amount of graphite in a second region of the pre-mold to form a first region of the mold having a different amount of graphite than a second region of the mold.

8. The method of claim 1, wherein the atmosphere contains at least 75% carbon dioxide.

9. The method of claim 1, wherein the reaction products comprise silica gel.

10. The method of claim 1, wherein the thermoplastic insert comprises polylactic acid.

11. The method of claim 1, wherein the burn point or the ignition point of the thermoplastic insert is less than 1200° F.

12. A method of forming a mold for a downhole tool or component thereof, the method comprising:
    filling a mold housing with graphite/sodium silicate/grain material mixture including between 0.1% and 10% graphite by weight, inclusive and shaping the mixture into a pre-mold having the same shape as the mold to be formed;
    subjecting the pre-mold to an atmosphere having elevated amounts of carbon dioxide as compared to ambient air for a time sufficient to allow the sodium silicate to react with the carbon dioxide to form sufficient reaction products to bind at least the graphite and solidify the mold;
    forming a thermoplastic insert via at least one technique selected from the group consisting of: 3D printing; machining a machinable polymer; and combining and then machining multiple sections of a machinable polymer; and
    positioning the thermoplastic insert in the mold; and
    after solidifying the mold, heating the mold to a temperature of at least the burn point or the ignition point of the thermoplastic insert for a time sufficient to burn away the thermoplastic insert.

13. The method of claim 12, wherein the thermoplastic insert comprises at least one machined component.

14. The method of claim 12, wherein the thermoplastic insert comprises a machinable or printable wax.

15. The method of claim 12, wherein the reaction products comprise silica gel.

16. The method of claim 12, wherein the mixture comprises at least one of Kaolin clay, carbon fiber, glass fiber, and any combinations thereof each in an amount of between 0.1% to 5% by weight, inclusive.

17. The method of claim 12, further comprising placing a mixture having one amount of graphite in a first region of the pre-mold and a mixture having a different amount of graphite in a second region of the pre-mold to form a first region of the mold having a different amount of graphite than a second region of the mold.

18. A method of forming a mold for a downhole tool or component thereof, the method comprising:
    filling a mold housing with graphite/sodium silicate/grain material mixture including between 0.1% and 10% graphite by weight, inclusive and shaping the mixture into a pre-mold having the same shape as the mold to be formed, wherein the mixture comprises between 0.5% and 10% sodium silicate and carbon dioxide reaction products by weight, inclusive and at least 75% grain material by weight, and wherein the mixture has a resistivity of between 50 Ohms and 100,000 Ohms, inclusive;
    subjecting the pre-mold to an atmosphere having elevated amounts of carbon dioxide as compared to ambient air for a time sufficient to allow the sodium silicate to react with the carbon dioxide to form sufficient reaction products to bind at least the graphite and solidify the mold, wherein the reaction products comprise silica gel;
    forming a thermoplastic insert via 3D printing or machining a machinable polymer or combining and then machining multiple sections of a machinable polymer;
    positioning the thermoplastic insert in the mold; and
    after solidifying the mold, heating the mold to a temperature of at least the burn point or the ignition point of the thermoplastic insert for a time sufficient to burn away the thermoplastic insert.

19. The method of claim 18, wherein the grain material comprises sand, wherein the reaction products also bind the sand.

20. The method of claim 18, wherein the burn point or the ignition point of the thermoplastic insert is less than 1200° F.

* * * * *